United States Patent [19]
Schultz

[11] Patent Number: 5,728,022
[45] Date of Patent: Mar. 17, 1998

[54] AUTOMOTIVE TRANSAXLE HAVING A TWO-SPEED FINAL DRIVE

[76] Inventor: Weston L. Schultz, 16223 Riverside Dr., Livonia, Mich. 48154

[21] Appl. No.: 639,739

[22] Filed: Apr. 29, 1996

[51] Int. Cl.⁶ .................................................. F16H 37/08
[52] U.S. Cl. ......................... 475/205; 475/204; 475/341
[58] Field of Search .............................. 475/198, 204, 475/205–206, 338, 341

[56] References Cited

U.S. PATENT DOCUMENTS

| | | | |
|---|---|---|---|
| 4,215,583 | 8/1980 | Shono et al. | 475/204 X |
| 4,779,699 | 10/1988 | Hatano | 475/206 X |
| 4,938,097 | 7/1990 | Pierce | 475/206 X |
| 4,969,532 | 11/1990 | Oyama et al. | 475/198 X |
| 5,129,870 | 7/1992 | Pierce | 475/285 |
| 5,129,871 | 7/1992 | Sandel et al. | 475/297 |
| 5,389,046 | 2/1995 | Timte et al. | 475/127 |
| 5,397,282 | 3/1995 | Weidman | 475/205 |
| 5,533,943 | 7/1996 | Ichioka et al. | 475/198 |

*Primary Examiner*—Khoi Q. Ta
*Assistant Examiner*—Peter T. Kwon

[57] ABSTRACT

A multiple ratio transaxle assembly for an automotive vehicle for delivering torque from a vehicle engine mounted on a first axis and a pair of axle half shafts mounted on a second axis in parallel disposition with respect to the first axis, the transaxle defining multiple geared torque flow paths with multiple forward driving ratios and having a differential gear unit having output gears connected drivably to the axle shafts, a two-speed final drive located at the torque output side of the multiple ratio gearing of the transaxle, the two-speed final drive being integrated with the differential gearing and the multiple ratio gearing of the transaxle to obtain improved fuel economy and increased torque ratio range.

9 Claims, 9 Drawing Sheets

| GEAR | 2/4 BAND | REVERSE CLUTCH | DIRECT CLUTCH | FORWARD CLUTCH | FORWARD ONE-WAY CLUTCH DRIVE | FORWARD ONE-WAY CLUTCH COAST | COAST CLUTCH | LOW/REV CLUTCH | LOW ONE-WAY CLUTCH DRIVE | LOW ONE-WAY CLUTCH COAST |
|---|---|---|---|---|---|---|---|---|---|---|
| REV |  | X |  |  |  |  |  | X |  |  |
| 1ST |  |  |  | X | X | OR |  |  | X | OR |
| 2ND | X |  |  | X | X | OR |  |  | OR | OR |
| 3RD |  |  | X | X | X | OR |  |  | OR | OR |
| 4TH | X |  | X | X | OR | OR |  |  | OR | OR |
| M-3RD |  |  | X | X | X |  | X |  | OR | OR |
| M-2ND | X |  |  | X | X |  | X |  | OR | OR |
| M-1ST |  |  |  | X | X |  | X | X | X |  |

X = TRANSMITS TORQUE   OR = OVERRUNNING

*Fig. 1a*

|  | | 1M | 1D | 2 | 3 | 4 | R |
|---|---|---|---|---|---|---|---|
| COAST BAND | | A | | | | | |
| FOURTH RATIO BAND | | | | | | A | |
| LOW-INT OWC | COAST | | OR | OR | | | |
| | DRIVE | H | H | H | | | |
| DIRECT OWC | COAST | H | | | OR | | |
| | DRIVE | | | | H | | |
| FORWARD OWC | COAST | | OR | | | | OR |
| | DRIVE | H | H | | | | H |
| REVERSE CLUTCH | | | | | | | A |
| LOW-INTERMEDIATE CLUTCH | | A | A | A | | | |
| INTERMEDIATE CLUTCH | | | | A | A | A | |
| DIRECT CLUTCH | | A | | | A | | |
| FORWARD CLUTCH | | A | A | | | A | A |
| GEAR | | 1M | 1D | 2 | 3 | 4 | R |

A = APPLIED
H = HOLDING
OR = OVERRUNNING

*Fig. 4a*

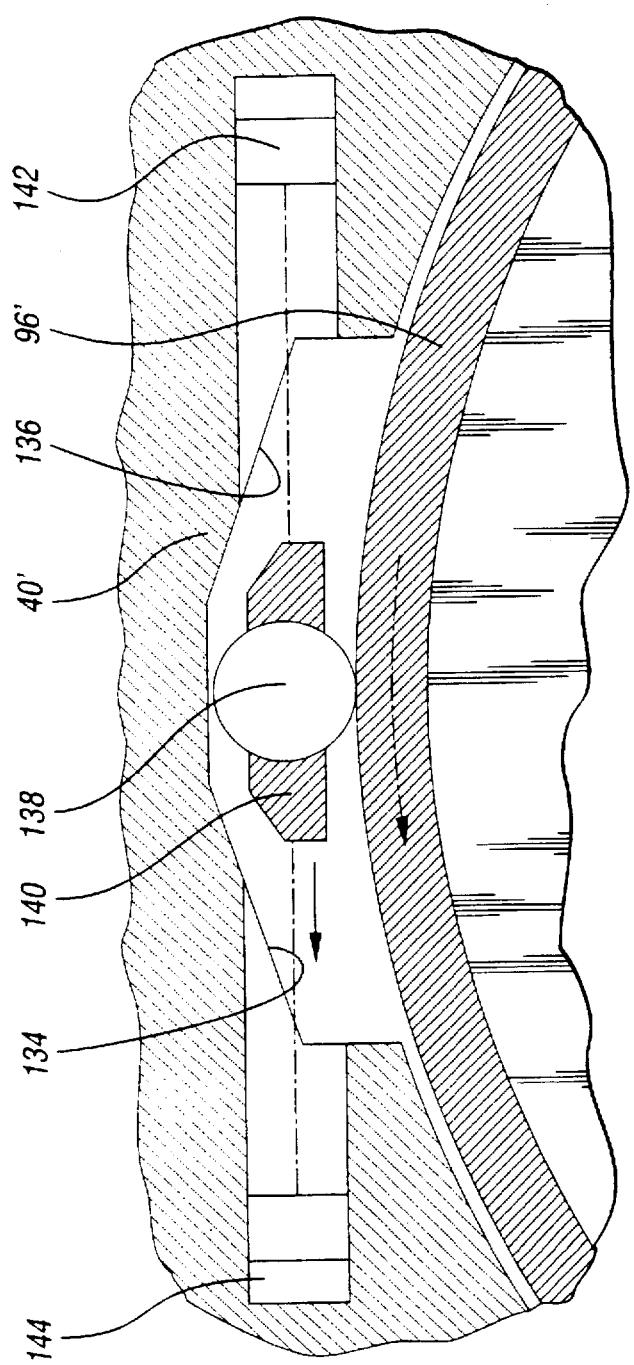

AUTOMOTIVE TRANSAXLE HAVING A TWO-SPEED FINAL DRIVE

TECHNICAL FIELD

The invention relates to multiple-ratio, automotive transaxles.

BACKGROUND OF THE INVENTION

I am aware of several automotive vehicle transaxle assemblies for use in front-wheel drive vehicles wherein the engine and the transmission are situated in transverse disposition with respect to the vehicle center line. A hydrokinetic torque converter is typically mounted on the engine axis, and the torque output shaft of the transaxle is mounted on an axis that is in spaced parallel disposition with respect to the engine axis. The torque output members of such transaxles are driven by a differential gear mechanism connected to the torque output element of the gearing.

In the transaxle of prior art U.S. Pat. No. 5,389,046, multiple ratio gearing is disposed in concentric disposition with respect to the engine axis. The torque output element of the multiple ratio gearing delivers torque to the torque input element of final drive gearing through a torque transfer drive chain. Another example of a transaxle arrangement of this kind is disclosed in prior art U.S. Pat. No. 4,938,097.

I am aware also of automotive transaxle assemblies for front-wheel drive vehicles having multiple ratio gearing which is disposed on the axis of the torque output shaft. An example of such an arrangement is disclosed in prior art U.S. Pat. No. 5,129,871. A hydrokinetic torque converter in the design of the '871 patent is located on the engine axis. The output of the torque converter is connected to the input elements of the multiple ratio gearing through a drive chain.

In each of the transaxle arrangements described in these prior art patents, the multiple ratio gearing establishes four forward driving ratios and a single reverse ratio. The highest speed ratio in each arrangement is an overdrive. Further, in each instance, a final drive reduction gear is used to provide a desired level of torque output without creating excess torque levels in the gearing elements of the multiple ratio gearing. Typically, the multiple ratio gearing, the torque converter, the final drive gearing and the differential gearing are located in a unitary housing assembly, the housing assembly being comprised of common die cast portions.

BRIEF DESCRIPTION OF THE INVENTION

The improvements of my invention may be applied to prior art transaxle assemblies of the kind described in the preceding discussion. It includes a two-speed final drive system that can be incorporated in an integrated fashion with torque transfer elements including the torque transfer gearing of transaxle designs adapted for contemporary front-wheel drive powertrains. The two-speed final drive of my invention will permit the addition of an extra gear ratio that will achieve improved fuel economy and which will enhance the torque ratio range that is available for increased performance. The two-speed gearing assembly may be used in lieu of the single ratio final drive gear unit typically used in a transaxle of the type described in the '046 patent, the '097 patent and the '871 patent. It is possible, by practicing the teachings of my invention, to provide an additional ratio by using simplified reaction brake elements and a simplified two-speed gear system at a location between the torque output elements of the multiple ratio gearing and the differential carrier for the differential gear assembly. A die cast housing of the kind used in transaxles such as those described in the preceding discussion would require only moderate, cost-efficient design changes and would not require major design modifications to the gearing or other torque transmitting elements of the transaxle.

The two-speed final drive of my invention comprises a double pinion epicyclic gear arrangement with two ring gears, one ring gear engaging one pinion portion and the other ring gear engaging the other pinion portion. The epicyclic gearing has a sun gear driven by the torque output elements of the multiple ratio gearing. The carrier for the compound planet pinion assembly is common to, or is connected directly to, the differential carrier of the differential gear assembly thereby providing an economy of space.

The ring gears are selectively braked, one being adapted for accommodating reaction torque in each direction. The brake for the other ring gear, during operation in one operating mode, will accommodate reaction torque in one direction. Free wheeling movement of the ring gear is accommodated in a second operating mode. In a third operating mode, the brake will accommodate reaction torque in the opposite direction.

BRIEF DESCRIPTION OF THE DRAWINGS

FIG. 1a is a chart showing the engagement-and-release pattern for the clutches and brakes of the transaxle of FIG. 1 as the transaxle operates in each of four forward driving ratios and a single reverse ratio;

FIG. 4a is a chart showing the clutch and brake engagement-and-release pattern for the transaxle of FIG. 4 as the transaxle effects achieves each of four forward driving ratios and a single reverse ratio;

FIG. 7 is a schematic cross-sectional view, partly in section, showing a two-way overrunning coupling that may be used as a releasable two-way brake for one of the ring gear brakes of the two-speed final drive of my invention.

DETAILED DESCRIPTION OF THE INVENTION

Figure 1:
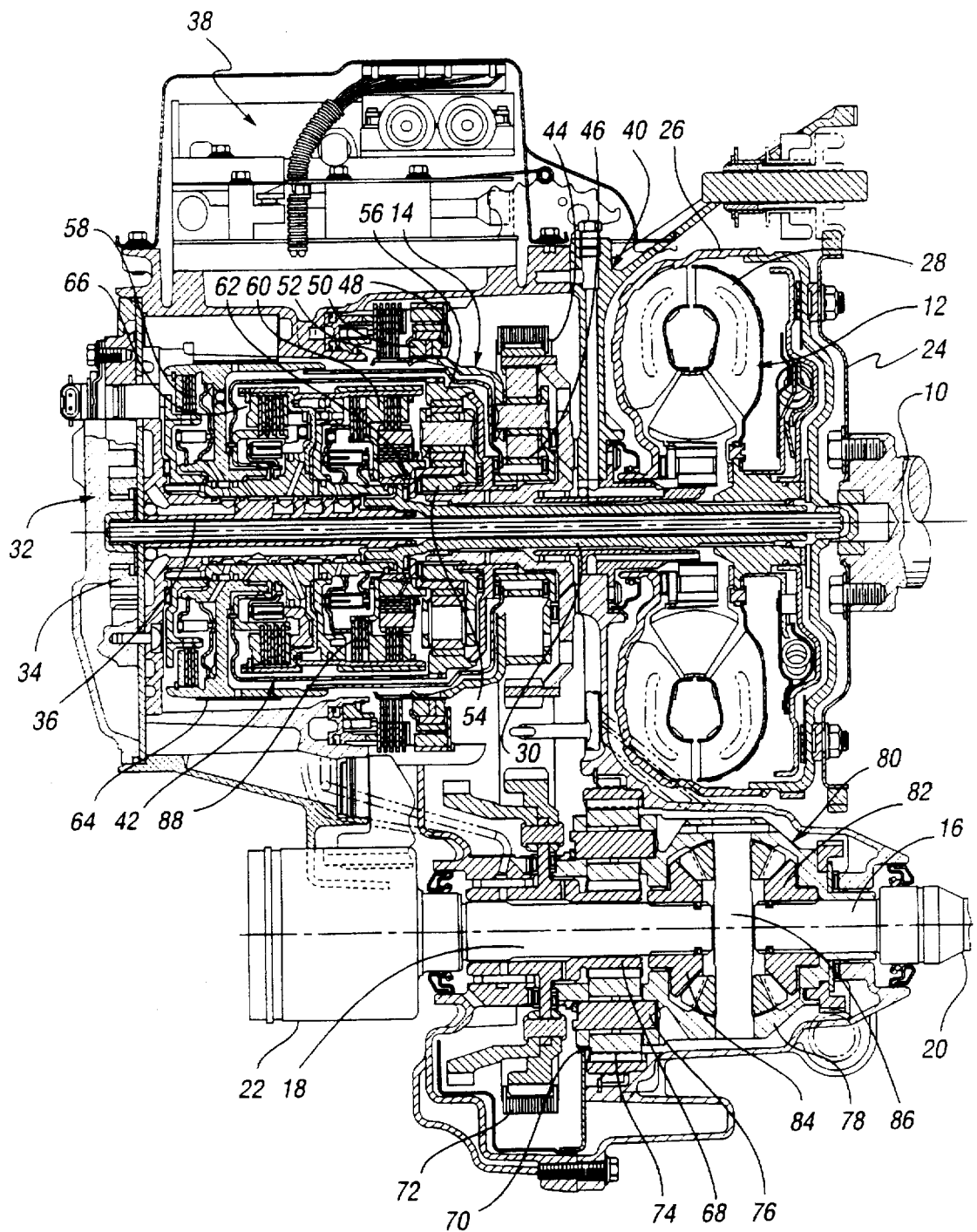
FIG. 1 is an assembly view of a prior art transaxle assembly capable of embodying the improvements of my invention.

In FIG. 1, which illustrates one example of a prior art transaxle mechanism, numeral 10 designates the crankshaft of an internal combustion engine. A hydrokinetic torque converter 12 and multiple ratio gearing 14 are disposed on the axis of the crankshaft 10.

Torque output shafts 16 and 18 are located on an axis that is spaced from and parallel to the axis of the crankshaft. The outboard ends 20 and 22 of the output shafts 16 and 18 are connected to axle half shafts for a front-wheel drive vehicle through constant speed universal joints in known fashion.

The crankshaft 10 is connected drivably through drive plate 24 with a torque converter impeller housing 26. Situated in housing 26 is a bladed turbine 28, which is connected drivably to turbine shaft 30.

A control pump body houses a hydraulic pressure pump 34 which is drivably connected to the crankshaft-driven impeller housing 26 through a centrally disposed pump driveshaft 36. The pump 34 supplies control pressure to the control valve body 38 situated at an upper location on the transmission housing, generally identified by reference numeral 40. The control valve body 38 controls application and release of clutches and brakes, generally identified by reference numeral 42.

The multiple ratio gearing comprises a ring gear 44, a sun gear 46, and planet pinions meshing with the ring gear 44 and sun gear 46, the pinions being carried by a carrier 48 that is braked during low speed, and manually held low speed operation by overrunning brake 50. The carrier 48 is braked by reverse brake 52 during reverse drive operation and manual low speed operation.

A second simple planetary gear unit of the planetary gear assembly 14 includes a sun gear 54 and a carrier which is connected to the ring gear 44 of the other simple planetary gear unit. Ring gear 56 of the first simple planetary gear unit is connected to the carrier 48 of the second simple planetary gear unit.

During reverse drive operation, the turbine shaft 30 is connected to the sun gear 46 through reverse clutch 58.

During operation in the first low speed drive, forward clutch 60 is applied, thereby permitting transfer of turbine torque through overrunning coupling 62 to sun gear 54. With the carrier 56 acting as a reaction member, ring gear 44 is driven in the lowest speed ratio. An upshift from the lowest speed ratio to the second speed ratio is achieved by engaging second and overdrive brake band 64, which anchors sun gear 46. With the overrunning coupling 50 free wheeling, the gearing provides a second speed ratio. A direct drive, third speed ratio is achieved by engaging direct drive clutch 66, which drivably connects the driven shaft with ring gear 56. Since the forward clutch 60 and the direct drive clutch 66 are engaged simultaneously, the elements of the multiple ratio gearing are driven with a 1:1 ratio.

An upshift from the third ratio to the fourth ratio, which is an overdrive ratio, is obtained by engaging the clutch 66 and the second and fourth ratio brake band 64. This causes driven torque to be delivered from turbine shaft 30 through engaged clutch 66 to the carrier 56. Since the sun gear 46 during fourth ratio operation is braked by the brake band 64, the ring gear 44 is overdriven with respect to the driven shaft.

Torque is transferred from the ring gear 44 to sun gear 68 of the final drive gear unit 70 through a drive chain illustrated schematically at 72. The final drive gear unit includes, in addition to the sun gear 68, a ring gear 74 which is splined to and held by the transmission housing 40. Carrier 76 of the final drive gear unit 70 is connected to the differential carrier 78 of differential gear assembly 80.

The assembly 80 includes side gears 82 and 84 that mesh with differential pinions supported on differential cross shaft 86. Each side gear 82 and 84 is connected, respectively, to output shafts 16 and 18.

The engagement and release sequence for achieving each of the four forward driving ratios and the single reverse ratio of the transaxle illustrated in FIG. 1 is summarized in the chart in FIG. 1a where the symbol "X" indicates an engaged clutch or brake and the symbol "OR" designates an overrunning condition for an overrunning coupling.

A coast clutch, shown at 88 in FIG. 1, is engaged, as indicated in FIG. 1a, when reaction torque in a coasting direction must be transferred around the overrunning coupling 50. It is engaged during manual drive operation in the first, second and third ratios, as indicated by the symbols M-3rd, M-2nd, and M-1st.

Figure 2:
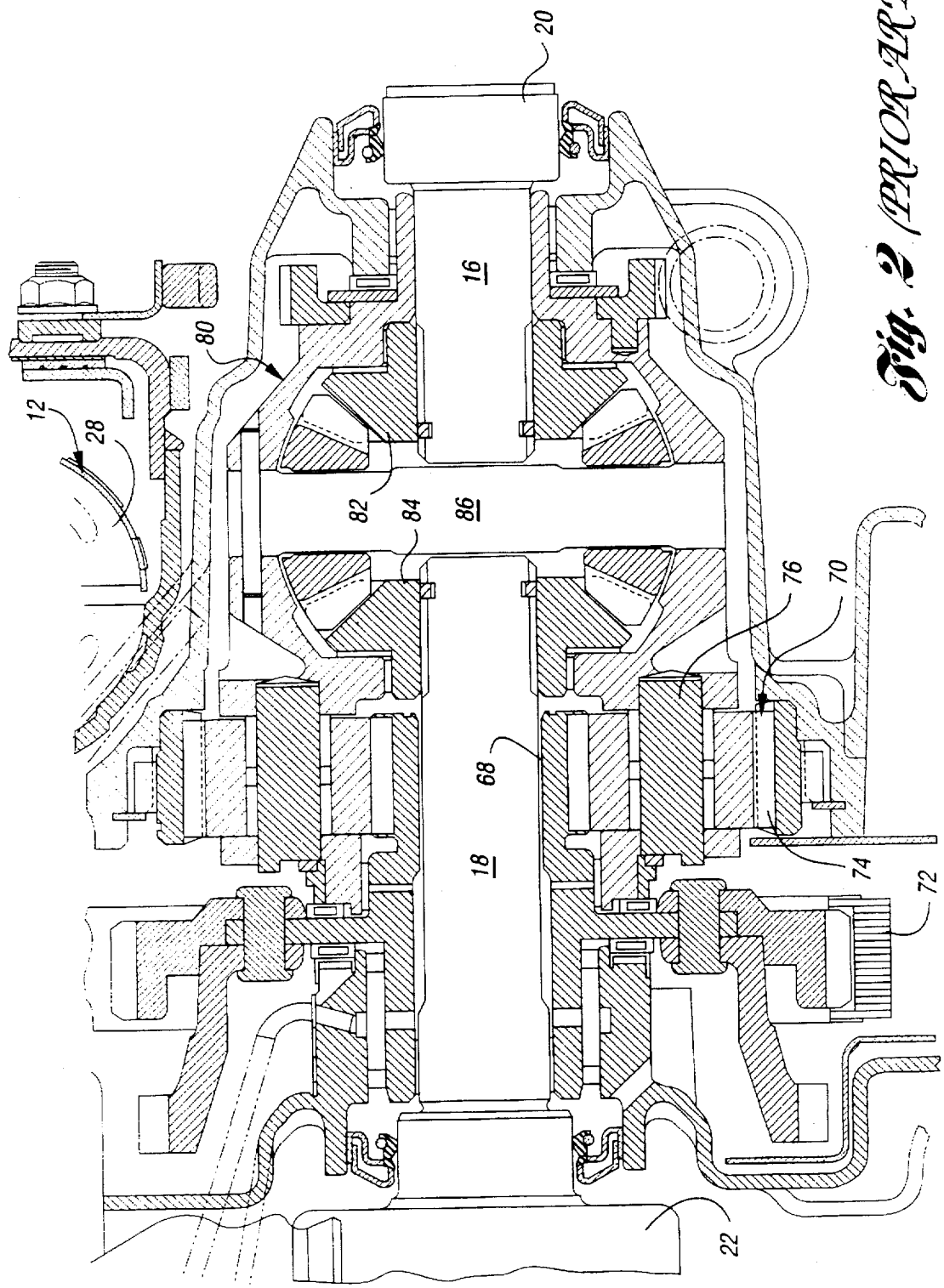
FIG. 2 is an enlarged view of the final drive gearing for the transaxle of FIG. 1.

FIG. 2 shows an enlargement of the final drive portion of the transaxle in FIG. 1. By comparing FIG. 2 with FIG. 3, the common structure of the prior art transaxle assembly of FIG. 1, which may be carried over to the improved transaxle of my invention, is more readily apparent.

The two-speed final drive gearing assembly of my invention includes multiple compound planetary pinions 90, each pinion comprising a primary pinion portion 92 and a secondary pinion portion 94. The pinion portions are formed as a single unit, each pinion portion having a discrete pitch diameter. In the embodiment shown in FIG. 3, the pitch diameter of pinion portion 92 is less than the pitch diameter of pinion portion 94.

Pinion portion 92 of each compound planetary pinion engages a ring gear 96. Similarly, pinion portions 94 engage a large pitch diameter ring gear 98. A reaction brake, generally designated by reference numeral 100, selectively anchors ring gear 98 and corresponding reaction brake 102 selectively anchors ring gear 96. The pinions 90 are journaled rotatably on a pinion carrier 104. The pinions may be end supported on the carrier 104 by end bearings 106 and 108.

The carrier 104 is joined to or formed integrally with differential carrier 110, which corresponds to the differential carrier 80 of FIG. 1. Differential carrier 110 forms a part of the differential assembly that includes side gear 112, which is drivably splined to a first output shaft 114. A second side gear 116 is splined drivably to a second output shaft 118. The side gears are engaged by differential pinions 120 and 122, which are rotatably supported by pinion cross shaft 124.

Sun gear 126 engages the primary pinion portion 92. It includes a sun gear shaft 128, which is journaled in the transmission housing portion 130. A chain sprocket 132 is engaged by drive chain 72, shown in FIG. 1.

The brake 100 may be a band brake of the kind shown, for example, at 64 in FIG. 1 or it may be a disc-type brake, as shown at 52 in FIG. 1. In either case, the brake will distribute ring gear torque from ring gear 98 to the transmission housing 40.

Brake 102 may be anchored, for example, by a disc brake such as that shown at 52 in FIG. 1. The brake for the ring gear 96 also may be a releasable overrunning coupling such as that shown in FIG. 7 in schematic form. In FIG. 7, the housing portion that surrounds the ring gear is identified by reference character 40'. The ring gear itself in the modification of FIG. 7 is shown at 96'. The housing 40' is provided with recesses that define ramps 134 and 136 that are engageable by overrunning coupling rollers 138. A roller cage 140 retains the rollers in the correct peripheral position with respect to the ramps, the slopes of which are oppositely disposed, one with respect to the other.

The peripheral position of the cage with respect to the housing can be controlled by pressure actuated servo pistons 142 and 144. When the cage 140 is positioned by the pressure actuated pistons 142 and 144 as shown in FIG. 7, the ring gear 96 is free to rotate relative to the housing in either direction. If the cage 140 is shifted in a counterclockwise direction as viewed in FIG. 7, the ring gear will be braked against rotation in the counterclockwise direction, but free wheeling motion in the opposite direction is permitted. On the other hand, if the cage 140 is shifted in a clockwise direction so that the rollers 138 engage ramp 136, ring gear 96' will be braked against rotation in the clockwise direction but free wheeling motion in the counterclockwise direction is permitted.

diametral pitch which is used for all primary and secondary gears. This assumption is a mathematical convenience only and not a design requirement. The variables that appear in the analysis are defined as follows:

| | | |
|---|---|---|
| $ns1 = 100 \cdot RPM$ | | Input shaft speed – sun gear $\left( RPM = \frac{\pi}{30} \cdot \frac{rad}{sec} \right)$ |
| $Ts1 = 100 \cdot in \cdot lbf$ | | Input shaft torque - sun gear |
| $Zs1 = 13$ | | Number of teeth on sun gear |
| $Zp1 = 12$ | | Number of teeth on primary planet pinion |
| $Zr1 = Zs1 + 2 \cdot Zp1$ | | Number of teeth on primary ring gear $Zr1 = 37$ |
| $Zp2 = 15$ | | Number of teeth on secondary planet pinion |
| $Zr2 = Zs1 + Zp1 + Zp2$ | | Number of teeth on secondary ring gear $Zr2 = 40$ |

During operation in the normal driving mode (low through fourth ratio and reverse), brake 102 is engaged, thereby holding ring gear 96. Brake 100 is released so that the ring gear 98 can rotate in either direction. Brake 102 anchors ring gear 96 and is capable of delivering reaction torque to the transmission housing in both directions.

During operation in the overdrive mode (fifth ratio), ring gear 98 must be held as brake 102 is released. Ring gear 96 rotates in the same direction as the sun and the carrier.

It is apparent from the foregoing discussion that the ring gear 96 must be held against rotation by the brake 102 in both directions, but it must be free to rotate when brake 100 is applied. The ring gear 98 must be free to rotate in both directions, but it must be held by the brake 100 during overdrive operation.

Figure 3:
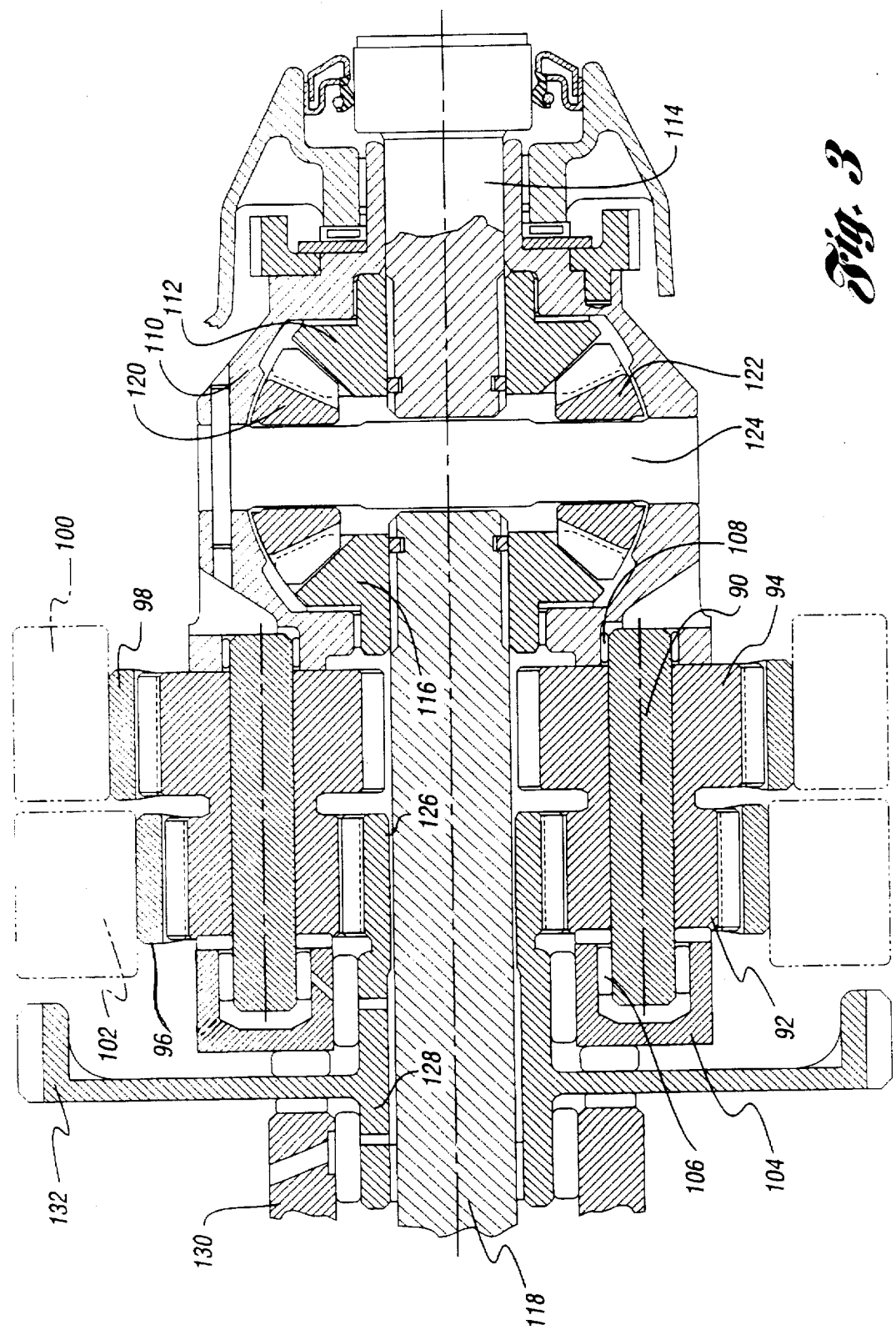
FIG. 3 is a schematic, cross-sectional assembly view of the two-speed final drive arrangement of my invention.

In the embodiment of FIG. 3, the input to the two-speed final drive is the sun gear 126, which meshes with planet pinion portion 92. Ring gear 96 meshes with pinion portions 92.

The pinion portions 92 and 94 are connected together such that rotary motion, forces and torques are transmitted directly between the pinion portions.

The pinion portions 94 mesh with ring gear 98. The number of planet pinion pairs that may be used is a mechanical design option. The carrier, which supports and encloses the planet pinions, acts as an output member.

When the ring gear 96 acts as a reaction member, it will cause the two-speed final drive to provide the primary final drive ratio as the ring gear 98 remains free to rotate in either direction. When the ring gear 98 is held as a reaction member, the ring gear 96 is released and may rotate freely as the system provides a secondary final drive ratio.

In the embodiment disclosed in FIG. 3, the ratio provided by pinion portions 92 is numerically higher than the ratio provided by pinions 94, thereby making the ratio provided by pinions 94 and ring gear 98 an overdrive gear set.

Although I have described a roller clutch in the embodiment of FIG. 7, it will be apparent to those skilled in the art that a sprag clutch or a multiple plate friction clutch may be used. In most applications, the two-speed final drive will be required to be shifted from one final drive ratio to the other and back. The dynamic character of these gear ratio changes will be dictated in part by the type of reaction elements that are selected for the two-speed final drive and the type of control system that is chosen for the transaxle.

The component speed and the component torque levels as a percentage of input shaft speed and torque is demonstrated by the following analysis. This analysis assumes a common The planetary final drive gearing using planet portion 92 is used for operation in the first second, third, fourth and reverse gears. Under these conditions, the speed and torque analysis is as follows:

$$nc1 = \left( \frac{Zs1}{Zr1 + Zs1} \right) \cdot ns1, \text{ Carrier (Output) speed } (nc1 = 26 \cdot RPM)$$

$$Tc1e = -2 \cdot \left( \frac{Zs1 + Zp1}{Zs1} \right) \cdot Ts1, \text{ Carrier (Output) torque – External}$$

$$(Tc1e = -384.6 \cdot in \cdot lbs)$$

$$Tr1e = \left( \frac{Zs1 + 2 \cdot Zp1}{Zs1} \right) \cdot Ts1, \text{ Primary ring gear (Reaction)}$$

torque External $(Tr1e = 284.6 \cdot in \cdot lbs)$

Planet pinion speed relative to the carrier $$n1planet = -\left( \frac{Zr1}{Zr1 + Zs2} \right) \cdot \left( \frac{Zs1}{Zp1} \right) \cdot ns1 \ (n1planet = -80.2 \cdot RPM)$$

$$nr2 = \left( \frac{Zp1 - Zp2}{2 \cdot Zp1} \right) \cdot \left( \frac{Zs1}{Zr2} \right) \cdot ns1, \text{ Secondary (free) ring gear speed}$$

$$(nr2 = -4.1 \cdot RPM)$$

$$F_{PFD} = \left( \frac{Zr1 + Zs1}{Zs1} \right), \text{ Primary Final Drive Ratio}$$

$$F_{PFD} = 3.846$$

When the transaxle is operating in the fifth overdrive ratio, the brake 102 is released and the brake 100 is applied, which makes the planet pinion portions 94 functional. In this instance, the speeds and torques are analyzed as follows:

$$nc2 = \left( \frac{Zp2}{Zp1 + Zp2} \right) \cdot \left( \frac{Zs1}{Zs1 + Zp1} \right) \cdot ns1,$$
Carrier (Output) speed $(nc2 = 28.9 \cdot RPM)$ $$Tc2e = -\left( \frac{Zs1 + Zp1}{Zs1} \right) \cdot \left( \frac{Zp1 + Zp2}{Zp2} \right) \cdot Ts1,$$

Carrier (Output) torque – External $$(Tc2e = -346.2 \cdot in \cdot lbf)$$

$$Tr2e = \left( \frac{Zs1 + Zp1\,Zp2}{Zs1} \right) \cdot \left( \frac{Zp1}{Zp2} \right) \cdot Ts1$$
Secondary Ring Gear (Reaction) Torque – External $$(Tr2e = 246.2 \text{ in ibs.})$$

-continued $$nr1 = \left(\frac{Zp2 - Zp1}{Zp2 + Zp1}\right) \cdot \left(\frac{Zs1}{Zr1}\right) \cdot ns1$$

Primary (free) ring gear speed ($nr1 = 3.9 \cdot$ RPM)

Planet pinion speed relative to the carrier:

$$n2\text{planet} = -\left(\frac{Zr2}{Zp2}\right) \cdot \left(\frac{Zp2}{Zp1 + Zp2}\right) \cdot \left(\frac{Zs1}{Zs1 + Zp1}\right) \cdot ns1,$$

($n2\text{planet} = -77 \cdot$ RPM)

$$F_{SFD} = \left(\frac{Zp1 + Zp2}{Zp2}\right) \cdot \left(\frac{Zs1 + Zp1}{Zs1}\right),$$

Secondary Final Drive Ratio ($F_{SFD} = 3.462$)

Percentage drop in input speed for a fixed output speed:

$$\% \text{ drop} = \frac{F_{PFD} - F_{SFD}}{F_{PFD}} \cdot 100 \quad (\% \text{ drop} = 10)$$

Figure 4:
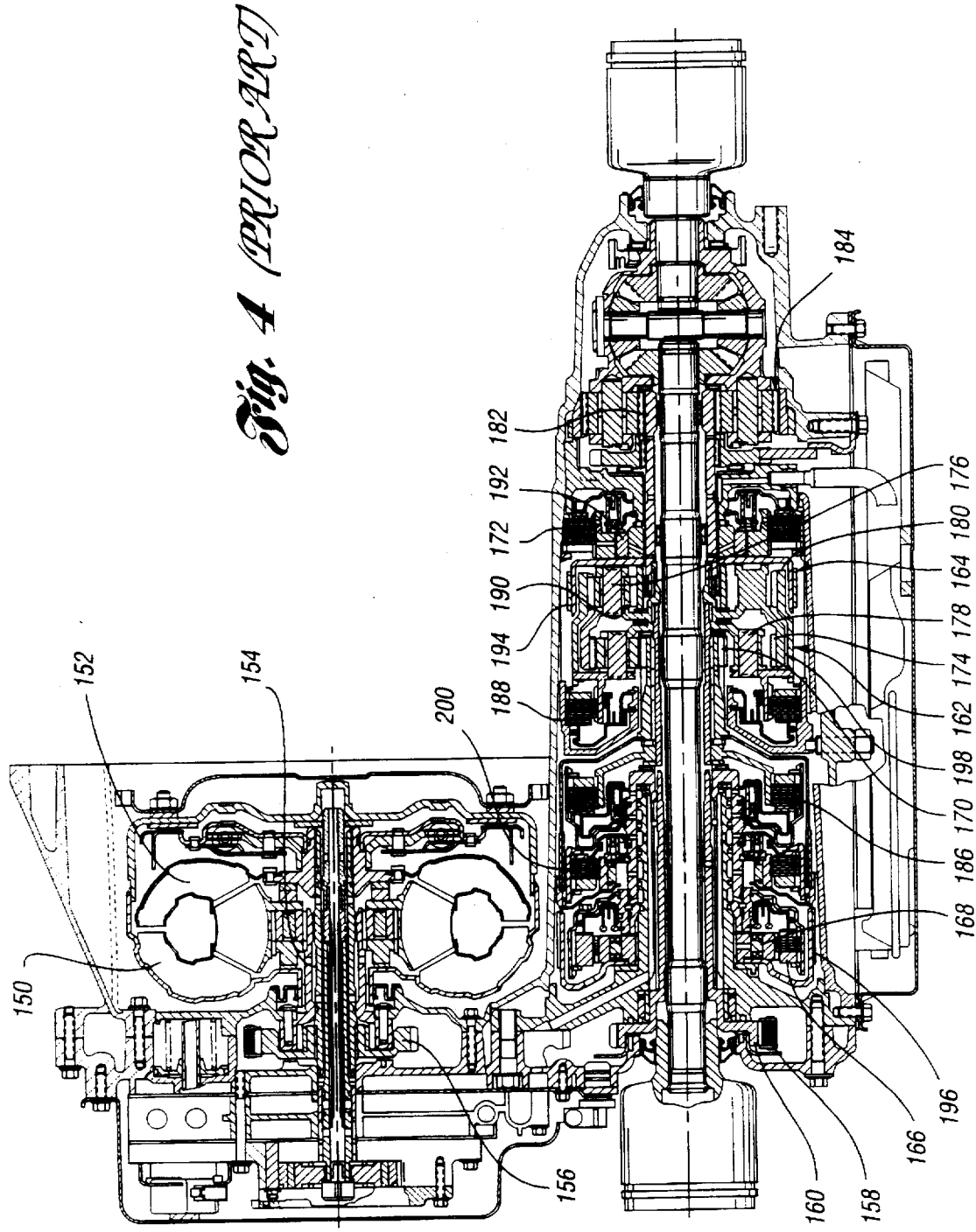
FIG. 4 is a cross-sectional assembly view of another prior art transaxle capable of embodying the improvements of my invention.
Figure 5:
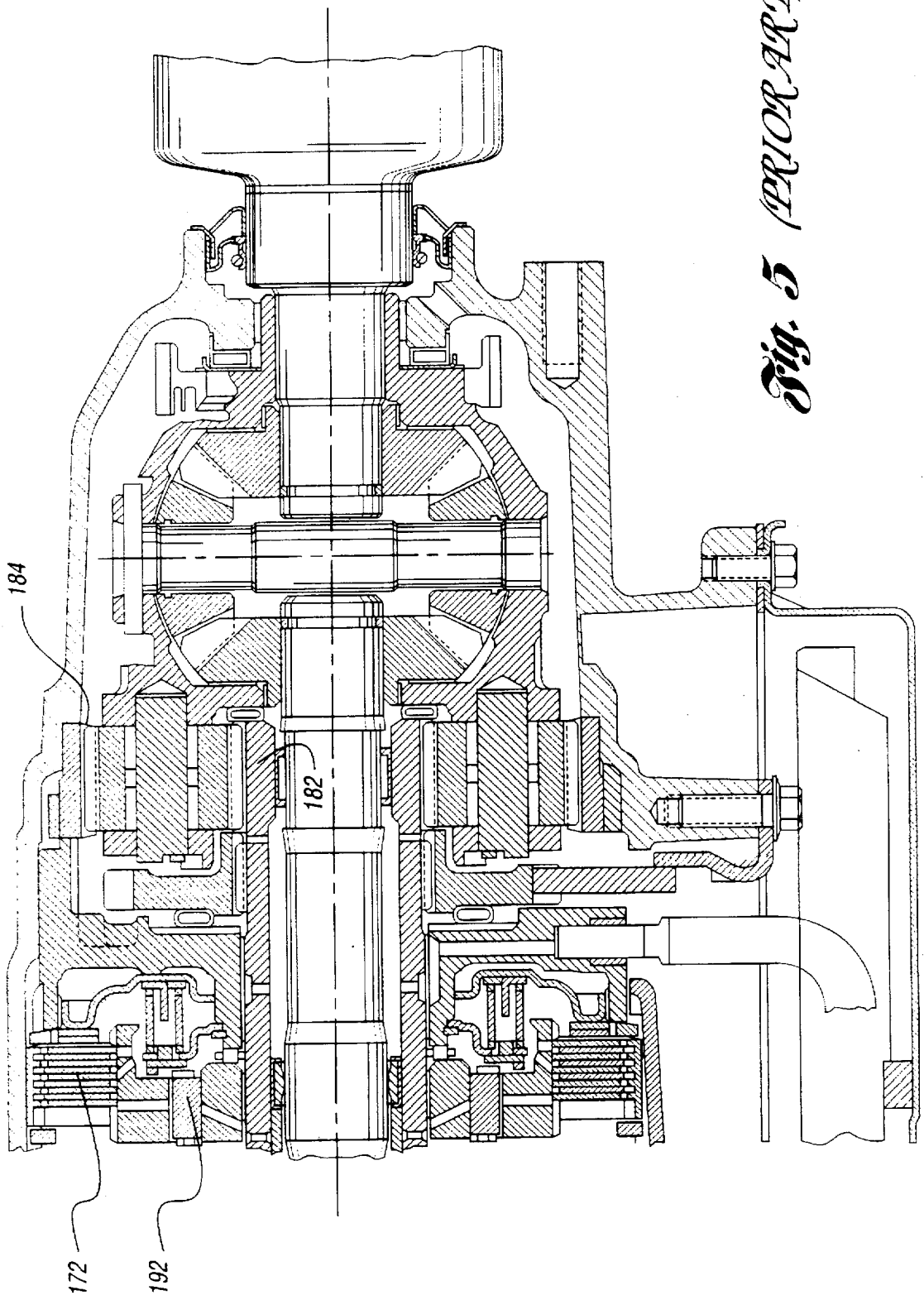
FIG. 5 is an enlarged view of the final drive portion of the transaxle of FIG. 4.

FIG. 4 shows another prior art transaxle that may be adapted to use the two-speed final drive improvements of my invention. As in the case of the prior art transaxle of FIG. 1, the transaxle of FIG. 4 includes a hydrokinetic torque converter located on an engine axis and an output shaft located on a second axis in parallel, spaced disposition with respect to the engine axis. In the case of the embodiment of FIG. 4, however, the multiple ratio gearing is located on the output shaft axis rather than the engine axis.

In the design of FIG. 4, engine torque is delivered to the impeller 150 of the hydrokinetic torque converter. Turbine driven 152 of the hydrokinetic torque converter delivers torque to driven shaft 154, which is drivably connected to drive sprocket 156 located on the engine axis. Drive chain 158 connects drivably the sprocket 156 with driven sprocket 160.

The compound planetary gearing of the transaxle of FIG. 4 comprises planetary gear unit 162 and planetary gear unit 164. Torque from driven sprocket 160 is transferred through an input sleeve shaft, through a forward clutch assembly 166 and through an overrunning coupling 168 to the sun gear 170 of the gear unit 162. During low speed ratio operation, brake 172 is applied thereby providing torque reaction. Ring gear 174 for gear unit 162 is connected to the carrier 176 of gear unit 164. The carrier 178 of gear unit 162 is connected to the ring gear 180 of gear unit 164. The carrier 176 for the second gear unit 164 is directly connected to the sun gear 182 of the final drive gear unit 184.

During reverse drive, the carrier 178 of the first gear unit 162 is braked by reverse multiple disc brake 188.

During forward drive low and intermediate operation, reaction torque from the sun gear 190 of the second gear unit 164 is transferred to the multiple disc brake 172 by an overrunning coupling 192. If hill braking is desired during low and intermediate speed ratio operation, brake band 194 can be applied.

During fourth ratio operation, brake band 196 is applied, which anchors the sun gear 170 of the first gear unit 162. Torque is delivered during fourth ratio operation as well as during third ratio operation to the carrier 178, thereby overdriving the ring gear 198 of the first gear unit 162, which is connected to the input sun gear 182 of the final drive gear unit 184.

During third speed ratio operation, both clutches 186 and 200 are applied.

The clutch and brake engagement-and-release pattern that is followed during operation in the first, second, third, fourth and reverse ratios for the transaxle of FIG. 4 is shown in FIG. 4a.

Figure 6:
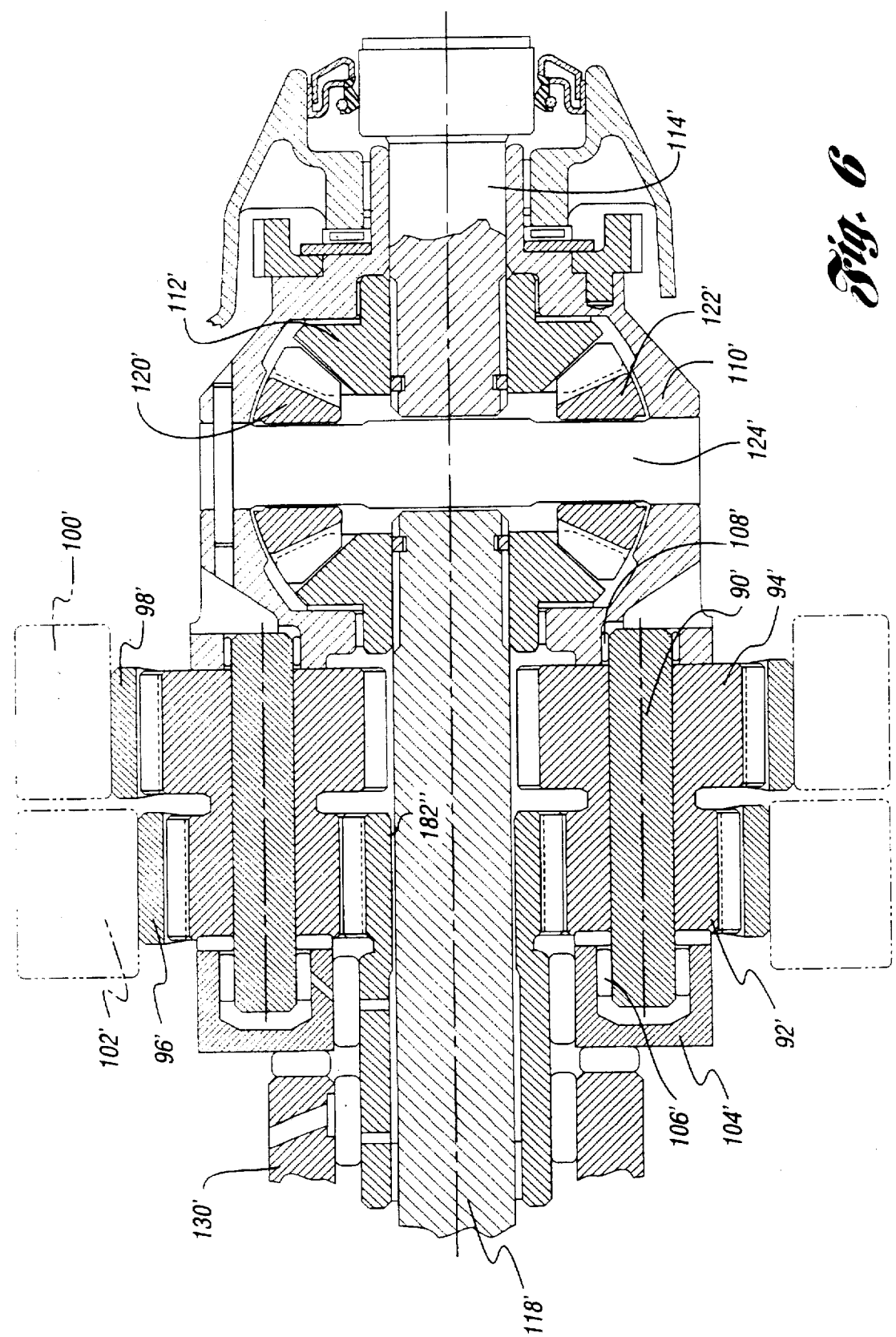
FIG. 6 is a schematic cross-sectional assembly view of the two-speed final drive of my invention as applied to a transaxle of the type illustrated in FIG. 4.

FIG. 6 shows the two-speed final drive assembly of my invention adapted for use in a transaxle of the kind indicated in FIG. 4. The drive input sleeve shaft corresponding to drive sprocket 132 of FIG. 3 is not fully illustrated in FIG. 6, but terminates in the final drive sun gear shown at 182" in FIG. 6. The 182 reference element, shown in FIG. 4, is the connecting sleeve shaft between planetary gear unit 164 and the final drive set sun gear. All of the other features of the FIG. 6 embodiment are generally similar to the embodiment shown in FIG. 3. The elements of the FIG. 6 construction that have counterpart elements in the FIG. 3 construction have been indicated with the same reference characters used in FIG. 3, although prime notations are added.

Having described preferred embodiments of my invention, what I claim and desire to secure by U.S. Letters Patent is:

1. A transaxle having multiple ratio gearing for an automotive vehicle driveline for delivering driving torque from an internal combustion engine to a driven shaft connected drivably to vehicle traction wheels, said driven shaft and said engine being disposed on spaced, parallel axes;

a hydrokinetic torque converter having a turbine and an impeller, said impeller being driven by said engine;

a torque transfer drive having a drive element connected drivably to said turbine, a driven element of said torque transfer drive being disposed on the axis of said driven shaft, said transaxle comprising:

a two-speed final drive defining torque flow paths of different speed ratios between said driven element of said torque transfer drive and said driven shaft;

said two-speed final drive comprising two reaction ring gears, a driven element connected to said driven shaft, and a driving gear element connected to said driven element of said torque transfer drive;

said transaxle including a differential gear unit with torque output side gears connected drivably to said traction wheels, said driven element of said two-speed final drive being connected to torque input gears of said differential gear unit;

said two-speed final drive comprising further epicyclic gearing having planet pinions with pinion portions of different pitch diameters;

a pinion carrier journalling said planet pinions, a separate ring gear meshing with each planet pinion portion;

a torque input sun gear engaging one planet pinion portion, said pinion carrier being connected to torque input portions of said differential gear unit; and discrete brakes for selectively anchoring said ring gears to effect each of two final drive speed ratios thereby extending the overall speed ratio range beyond the range of speed ratios available in said multiple ratio gearing.

2. The transaxle as set forth in claim 1 wherein said one planet pinion portion has a pitch diameter that is smaller than the pitch diameter of the other of said pinion portions.

3. The transaxle as set forth in claim 2 including first brake means for anchoring the ring gear for said other of said pinion portions thereby accommodating torque reaction in each direction, and second brake means for anchoring the ring gear for said one planet pinion portion selectively against rotation in either direction and for accommodating rotation of said ring gear for said one planet gear portion in each direction.

4. The transaxle as set forth in claim 3 wherein said second brake means comprises a double-acting overrunning brake having a stationary outer race, an inner race connected to the ring gear for said one planet pinion portion, double acting cam surfaces in said outer race and angularly shiftable overrunning coupling elements between said races engageable with one of said cam surfaces to effect braking in one direction and engageable with the other of said cam surfaces to effect braking in the opposite direction, said coupling elements being shiftable to a position intermediate said cam surfaces to effect free overrunning relative motion of said races when said ring gear for said other of said planet pinion portions is braked.

5. A transmission having multiple ratio gearing for an automotive vehicle driveline for delivering driving torque from an internal combustion engine to a driven shaft;

a hydrokinetic torque converter having a turbine and an impeller, said impeller being driven by said engine;

a torque transfer drive having a drive element connected drivably to said turbine, a driven element of said torque transfer drive being disposed on the axis of said driven shaft, said transmission comprising:

a two-speed final drive defining torque flow paths of different speed ratios between said driven element of said torque transfer drive and said driven shaft;

said two-speed final drive defining torque flow paths of different speed ratios between said driven element of said torque transfer drive and said driven shaft;

said two-speed final drive comprising two reaction ring gears, a driven element connected to said driven shaft, and a driving gear element connected to said driven element of said torque transfer drive;

said driven shaft being connected drivably to vehicle traction wheels;

said two-speed final drive further comprising epicyclic gearing having planet pinions with pinion portions of different pitch diameters;

a pinion carrier journalling said planet pinions, and a separate ring gear meshing with each planet pinion portion; and a torque input sun gear engaging one planet pinion portion and said pinion carrier being connected to said transmission driven shaft;

said two-speed final drive comprising discrete brakes for selectively anchoring said ring gears to effect each of two final drive speed ratios thereby extending the overall speed ratio range beyond the range of speed ratios available in said multiple ratio gearing.

6. The transmission as set forth in claim 5 wherein said one planet pinion portion has a pitch diameter that is smaller than the pitch diameter of the other of said pinion portions.

7. The transmission as set forth in claim 6 including first brake means for anchoring the ring gear for said other of said pinion portions thereby accommodating torque reaction in each direction, and second brake means for anchoring the ring gear for said one planet pinion portion selectively against rotation in either direction and for accommodating rotation of said ring gear for said one planet gear portion in each direction.

8. The transmission set forth in claim 6 wherein said planet pinion portions comprise an integral pinion assembly, said pinion carrier journalling said pinion portions for engagement with their respective ring gears, said sun gear engaging the pinion portion of smaller pitch diameter.

9. The transmission as set forth in claim 7 wherein said second brake means comprises a double acting overrunning brake having a stationary outer race, an inner race connected to the ring gear for said one planet pinion portion, double acting cam surfaces in said outer race and angularly shiftable overrunning coupling elements between said races engageable with one of said cam surfaces to effect braking in one direction and engageable with the other of said cam surfaces to effect braking in the opposite direction, said coupling elements being shiftable to a position intermediate said cam surfaces to effect free overrunning relative motion of said races when said ring gear for said other of said planet pinion portions is braked.

* * * * *